(12) United States Patent
Lee et al.

(10) Patent No.: US 12,379,596 B2
(45) Date of Patent: Aug. 5, 2025

(54) INPUT COUPLER COMPONENT, OPTICAL DISPLAY SYSTEM AND ELECTRONICS APPARATUS

(71) Applicants: University of Central Florida Research Foundation, Inc., Orlando, FL (US); Goertek Inc., Shandong (CN)

(72) Inventors: Yun-Han Lee, Orlando, FL (US); Guanjun Tan, Orlando, FL (US); Tao Zhan, Orlando, FL (US); Kun Yin, Orlando, FL (US); Jianghao Xiong, Orlando, FL (US); Shin-Tson Wu, Orlando, FL (US); Sheng Liu, Santa Clara, CA (US); Jilin Yang, Santa Clara, CA (US)

(73) Assignees: University of Central Florida Research Foundation, Inc., Orlando, FL (US); Goertek Inc., Shandong (CN)

( * ) Notice: Subject to any disclaimer, the term of this patent is extended or adjusted under 35 U.S.C. 154(b) by 781 days.

(21) Appl. No.: 17/618,144

(22) PCT Filed: Aug. 18, 2020

(86) PCT No.: PCT/CN2020/109673
§ 371 (c)(1),
(2) Date: Dec. 10, 2021

(87) PCT Pub. No.: WO2021/032072
PCT Pub. Date: Feb. 25, 2021

(65) Prior Publication Data
US 2022/0236570 A1 Jul. 28, 2022

Related U.S. Application Data

(60) Provisional application No. 62/888,573, filed on Aug. 19, 2019.

(51) Int. Cl.
*G02B 5/30* (2006.01)
*F21V 8/00* (2006.01)
(Continued)

(52) U.S. Cl.
CPC ....... *G02B 27/0172* (2013.01); *G02B 5/1842* (2013.01); *G02B 5/3025* (2013.01); *G02B 6/0023* (2013.01); *G02B 6/005* (2013.01)

(58) Field of Classification Search
CPC .............. G02B 27/0172; G02B 5/1842; G02B 5/3025; G02B 6/0023; G02B 6/005;
(Continued)

(56) References Cited

U.S. PATENT DOCUMENTS 9,235,097 B2 * 1/2016 Meade ................. G02B 6/2706
10,088,675 B1 * 10/2018 Brown ..................... G02B 5/32
(Continued)

*Primary Examiner* — Mustak Choudhury
(74) *Attorney, Agent, or Firm* — Baker Botts LLP

(57) ABSTRACT

An input coupler component, optical display system and electronics apparatus are disclosed. The input coupler component comprises: an input polarization volume grating, which is disposed to deflect an input polarized electromagnetic wave into a waveguide in a total internal reflection manner; and an input polarization management layer, which adjusts the polarization of the deflected electromagnetic wave to a polarization state different from that of electromagnetic wave to be deflected by the input polarization volume grating.

10 Claims, 4 Drawing Sheets

(51) Int. Cl.
*G02B 5/00* (2006.01)
*G02B 5/18* (2006.01)
*G02B 27/01* (2006.01)

(58) Field of Classification Search
CPC ............... G02B 5/1828; G02B 5/1833; G02B 27/0081; G02B 27/4261; G02B 5/3016
See application file for complete search history.

(56) References Cited

U.S. PATENT DOCUMENTS

| | | | |
|---|---|---|---|
| 10,234,686 B2* | 3/2019 | Vallius | G02B 6/0026 |
| 10,690,916 B2* | 6/2020 | Popovich | G02B 6/0035 |
| 2004/0096141 A1* | 5/2004 | Singh | G02B 6/12007 |
| | | | 385/11 |
| 2017/0363811 A1* | 12/2017 | Ayres | G02B 27/286 |
| 2019/0121027 A1* | 4/2019 | Popovich | G02B 27/283 |
| 2019/0265486 A1* | 8/2019 | Hansotte | G02B 6/0016 |

* cited by examiner

INPUT COUPLER COMPONENT, OPTICAL DISPLAY SYSTEM AND ELECTRONICS APPARATUS

CROSS-REFERENCE TO RELATED APPLICATIONS

This application is a National Stage of International Application No. PCT/CN2020/109673, filed on Aug. 18, 2020, which claims priority to US Provisional Patent Application No. 62/888,573, filed on Aug. 19, 2019, both of which are hereby incorporated by reference in their entireties.

FIELD OF THE INVENTION

This disclosure relates to the technical field of optical display, and more specifically, relates to an input coupler component, an optical display system and an electronics apparatus.

BACKGROUND OF THE INVENTION

An optical display system includes an input coupler and an output coupler. The input coupler introduces an image light, which is a kind of electromagnetic wave, into a waveguide. The electromagnetic wave travels in the waveguide to the output coupler. The output coupler directs the electromagnetic wave out of the waveguide and to the eyes of a viewer.

Such an optical display system can be used in many applications, such as Near-eye displays (NEDs). Near-eye displays (NEDs) utilize magnifying optics to magnify and project the display image to viewable size/distance. See-through type NEDs are also referred to as augmented reality (AR) displays in which the displayed image is overlaid to the environment with an optical see-through apparatus. For this type of NEDs, the viewer can see the displayed image and the environment at the same time. Therefore, in addition to magnifying optics, AR system requires an optical combiner to combine the displayed images and the environment. The optical combiners can be a simple polarizing/non-polarizing beam splitter cube, partial reflective concave mirrors or holographic grating (HG) coupled waveguides. For the former two, a partially reflecting component is placed physically at an angle such that the displayed light can be reflected at an angle toward the viewer without blocking the environment. However, this type of device has a trade-off between form-factor and field of view (FOV). An example of this kind of device is Google Glass™ in which a small beam splitter as a combiner, resulting in a small form-factor with a narrow FOV. A counterpart of this kind of device is Meta 2™ in which a large partial reflective off-axis concave mirror is used, resulting in a large form-factor with wide FOV.

For AR devices using HG-coupled waveguides, a thin film of HG serves as an in-coupled grating to guide the collimated displayed light into a compact waveguide, and then an out-coupled grating deflects the light toward user's eye. This configuration allows a slim design and thus is a preferred approach for AR devices. Common HGs are made of isotropic materials with alternative slanted layers of high and low refractive index. The angular bandwidth for a single HG is determined by the index contrast. HGs based on dichromated gelatin can provide an index contrast as high as 0.15. However, this type of HGs is sensitive to humidity, temperature, and other environmental conditions, which makes it extremely unstable and causes defects in the grating structures. Nowadays, most of display applications choose Photo-polymers as recording media with index contrast around 0.035. As a result, the deflection has a high angle/wavelength selectivity. Low contrast HGs allow almost 100% transmittance of the environment light; however, this also implies a low efficiency and a small acceptance angle for the display light, resulting in a small field of view (<5°) and higher energy consumption. To have a larger field of view while maintaining a thin profile, HGs with multi-layered structures are exploited, which not only reduces the transmittance but also significantly increases the cost. HGs based on surface-relieve structures are utilized in Microsoft Hololens™. This type of HGs is made through imprinting to create slanted polymer structure. Since the contrast between polymer and air is large, this type of HGs has superior performance to the photo-polymer-based HGs. However, surface-relieve HGs are very difficult to fabricate. Therefore, the cost remains very high comparing to other solutions.

SUMMARY OF THE INVENTION

One object of this disclosure is to provide a new technical solution for optical display system.

According to a first aspect of the present disclosure, there is provided an input coupler component, comprising: an input polarization volume grating, which is disposed to deflect an input polarized electromagnetic wave into a waveguide in a total internal reflection manner; and an input polarization management layer, which adjusts the polarization of the deflected electromagnetic wave to a polarization state different from that of electromagnetic wave to be deflected by the input polarization volume grating.

According to a second aspect of the present disclosure, there is provided an optical display system, comprising: the input coupler component according to an embodiment; and an output coupler component.

According to a third aspect of the present disclosure, there is provided an electronic device comprising the optical display system according to an embodiment.

According to an embodiment of this disclosure, a performance of an input coupler can be improved.

Further features of the present disclosure and advantages thereof will become apparent from the following detailed description of exemplary embodiments according to the present disclosure with reference to the attached drawings.

BRIEF DESCRIPTION OF THE DRAWINGS

The accompanying drawings, which are incorporated in and constitute a part of the specification, illustrate embodiments of the disclosure and, together with the description thereof, serve to explain the principles of the disclosure.

DETAILED DESCRIPTION OF THE EMBODIMENTS

Figure 1:
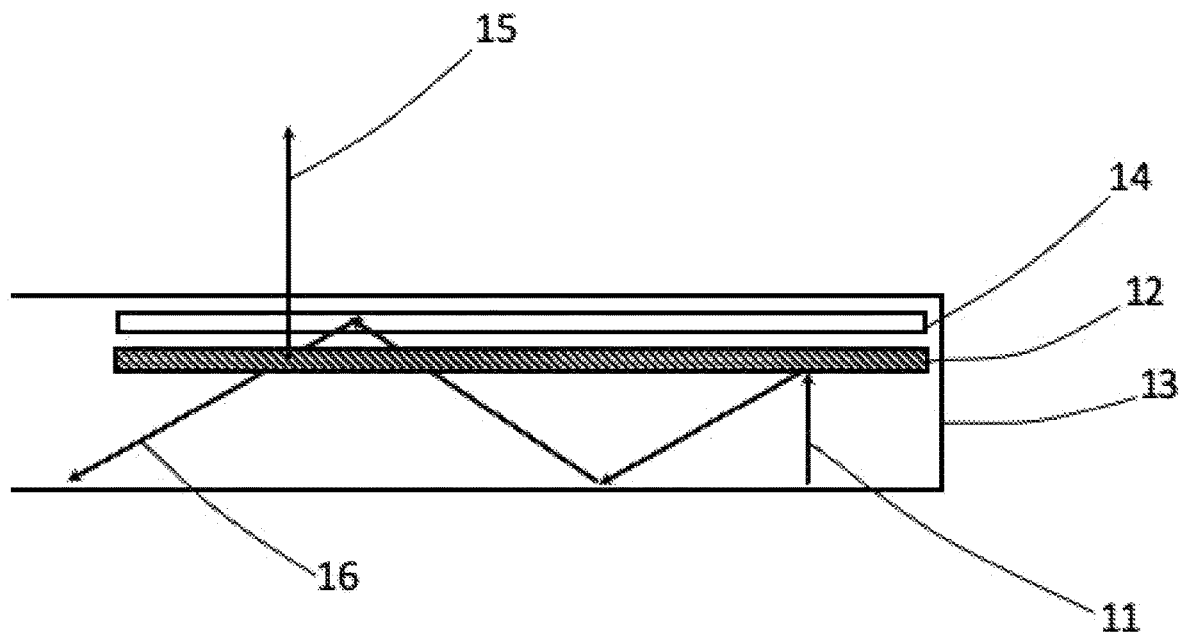
FIG. 1 is a top schematic plan view of an optical display system according to an exemplary augmented reality application embodiment of the disclosure.

Various exemplary embodiments of the present disclosure will now be described in detail with reference to the drawings. It should be noted that the relative arrangement of the components and steps, the numerical expressions, and numerical values set forth in these embodiments do not limit the scope of the present disclosure unless it is specifically stated otherwise.

The following description of at least one exemplary embodiment is merely illustrative in nature and is in no way intended to limit the disclosure, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 schematically illustrates the input side of the waveguide. The input side of the waveguide is an input coupler component. The input coupler component can be discrete or be integrated into an optical display system.

As shown in FIG. 1, the input coupler component comprises an input polarization volume grating 12 and an input polarization management layer 14.

The input polarization volume grating 12 is disposed to deflect an input polarized electromagnetic wave 11 into a waveguide 13 in a total internal reflection manner. The input polarization volume grating 12 is, for example, a reflective polarization volume grating. It can reduce the light leakage at input side with a thin waveguide.

The input polarization management layer 14 adjusts the polarization of the deflected electromagnetic wave to a polarization state different from that of electromagnetic wave to be deflected by the input polarization volume grating 12.

In such a waveguide-based optical display system, such as a waveguide-based AR device, at the input side of the waveguide, the light deflected by an in-coupling grating will normally be guided by the total internal reflection (TIR) in the waveguide. In a situation without the input polarization management layer 14 disclosed here, if the guided light hits the in-coupling grating again along the opposite direction, it will leak out because of reversibility of optical path, which reduces the overall optical efficiency. To prevent hitting, the in-coupling grating again, the most common solutions are to reduce the size of the in-coupling grating or to keep the waveguide at a sufficient thickness (≥1 mm).

In FIG. 1, the electromagnetic wave 11 such as light ray from an input source is deflected by the input polarization volume grating 12. The input polarization volume grating 12 is polarization-selective. The input source can provide desired polarized electromagnetic wave 11 through various manners. The polarized electromagnetic wave 11 may be linearly polarized or circularly polarized. For example, the input source can include a programmable/controllable (virtual) image-generating component adapted to generate a polarized image output. Since the input source is not what is concerned in this disclosure, the description thereof is omitted. For example, the input polarization volume grating 12 has a twist structure in the axial direction designed for the wavelength and field of view of the image-generating system (input source). For example, the twist structure has changed twist pitches in the axial direction. Furthermore, the twist structure has gradually changing twist pitches in the axial direction. Optionally, the twist structure has at least two grating layers, which have different twist pitches. The input polarization volume grating 12 can be a liquid crystal component. For example, orientations of liquid crystal molecules in the input polarization volume grating 12 has a twist pitch in the axial direction. The input polarization volume grating 12 may be made by cascading two or more thin sublayer of polarization volume gratings, with different twist pitches in the axial direction. For example, the liquid crystal molecules in the input polarization volume grating has a continuously changing twist pitch in the axial direction.

The deflected polarized electromagnetic wave 11 is theta TIR-reflected at the lower side of the waveguide 13 and travels toward the input polarization volume grating 12 again. The electromagnetic wave 11 will pass through the input polarization volume grating 12 and encounter the input polarization management layer 14. The input polarization management layer 14 is preferably a uniaxial or a biaxial film and is used for modulating the polarization state. For example, the input polarization management layer 14 is a uniaxial film with optical axis vertical to the substrate.

The input polarization management layer 14 may a liquid crystal layer with a patterned optical axis. For example, the liquid crystal layer has a thickness between 0.1 to 5 micrometers. Optionally, the liquid crystal layer has a birefringence between 0.02 to 0.2. For example, the said liquid crystal layer is electrically addressable.

After TIR reflected from the upper side of the waveguide 13, the electromagnetic wave 11 encounters the input polarization management layer 14 again. Because of reversibility of optical path, when the electromagnetic wave 11 encounters the input polarization volume grating 12, if the polarization of the electromagnetic wave 11 is not adjusted and is as that of the original polarized electromagnetic wave 11, it will be deflected out by the input polarization volume grating 12, as ray 15. Since the input polarization management layer 14 adjusts the electromagnetic wave 11 to a different polarization state, the electromagnetic wave 11 will maintain its direction as ray 16. Thus, the polarization management layer 14 is designed such that the polarization state of the light will allow maximized amount of the light to maintain in the waveguide, as indicated by ray 16. As such, the performance of the input coupler component such as optical efficiency is improved.

The polarization management layer 14 can be anywhere in the waveguide 13 or on the surface of the waveguide 13.

In an example, as shown in FIG. 1, the waveguide 13 has an upper side and a lower side. The input polarized electromagnetic wave 11 is input from the lower side, and the input polarization management layer 14 is disposed between a back of the input polarization volume grating 12 and the upper side of the waveguide 13. In such a configuration, the deflected electromagnetic wave is adjusted by the input polarization management layer 14. This will ensure the adjustment effect of the input polarization management layer 14.

For example, the input polarization management layer 4 adjusts the polarization of the electromagnetic wave 11 to a polarization state opposite to that of the electromagnetic wave to be deflected by the input polarization volume grating. For instance, the input polarization volume grating 12 deflects left-handedness or right-handedness polarized electromagnetic wave, and the input polarization management layer 14 adjusts the polarization of the electromagnetic wave to a right-handedness or left-handedness polarization state.

The electromagnetic wave 11 may be light, such as light of an image. It can be visible light, or infrared light, or ultraviolet light. The input coupler component may include the waveguide 13.

Figure 2:
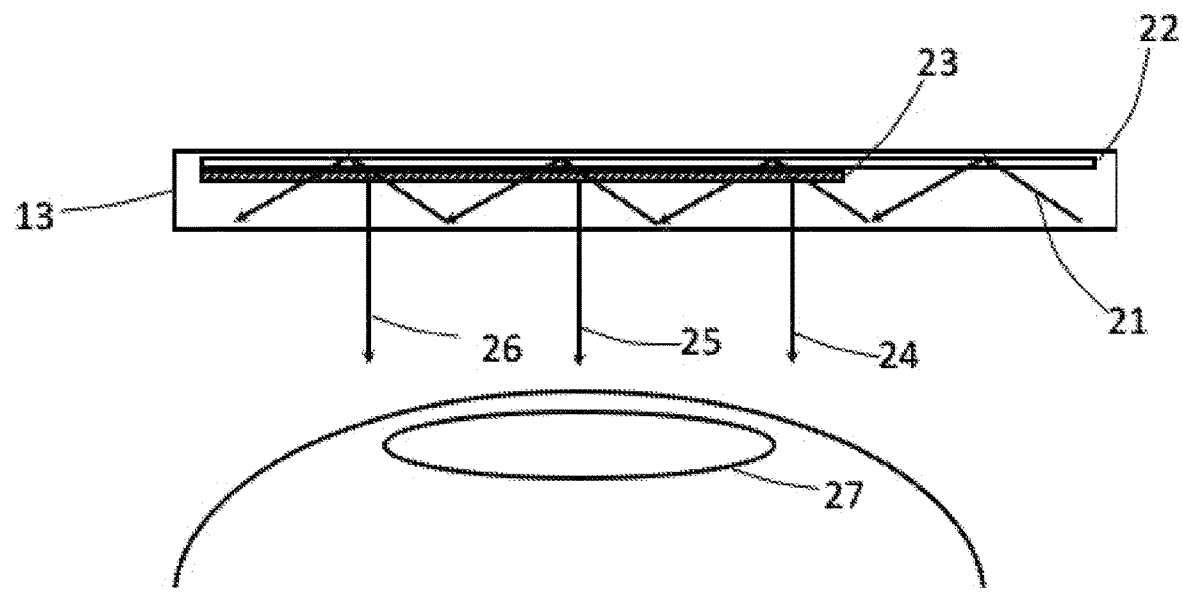
FIG. 2 is a top schematic plan view of an optical display system according to an exemplary augmented reality application embodiment of the disclosure.

FIG. 2 schematically illustrates the output side of the waveguide. The output side of the waveguide is an output coupler component. The output coupler component can be discrete or be integrated into an optical display system.

As shown in FIG. 2, the output coupler component comprises an output polarization volume grating 23 and an output polarization management layer 22.

The output polarization volume grating 23 selectively deflects the polarized electromagnetic wave 21 guided by the waveguide 13 out of the waveguide, as indicated by the rays 24, 25, 26.

The output polarization volume grating 23 may have a twist structure in the axial direction designed for the wavelength and field of view of the image-generating, system (the input source). The twist structure may have changed twist pitches in the axial direction. The twist structure may have gradually changing twist pitches in the axial direction. For example, the twist structure has at least two grating layers, which have different twist pitches.

For example, the output polarization volume grating 23 is a liquid crystal component. For instance, orientations of liquid crystal molecules in the output polarization volume grating has a twist pitch in the axial direction. For example, the output polarization volume grating is made by cascading two or more thin sublayer of polarization volume gratings, with different twist pitches in the axial direction. Optionally, the liquid crystal molecules in the output polarization volume grating has a continuously changing twist pitch in the axial direction.

The output polarization management layer 22 manages the amount of electromagnetic wave 21 to be deflected by the output grating by adjusting polarization of desired portions of the polarized electromagnetic wave to a polarization state to be deflected by the output polarization volume grating 23.

The traditional optical display system needs exit-pupil expansion. Taking a waveguide-based AR device as an example, since the input grating and the display are both small, the viewing region (i.e., the exit-pupil) of an AR device is inherently small. As a result, an exit-pupil expander is needed to replicate parallel light ray over a larger area. Such an exit-pupil expander is usually made by exploiting gradient efficiency of the out-coupling grating such that the TIR-guided light will partially couple out at each encounter of the grating with reasonably uniform output intensity.

This embodiment provides a new approach for expanding the electromagnetic wave or light ray 21 under a different theory. In the embodiment of FIG. 2, the light ray 21 from the input side of the waveguide 13 encountered, the output polarization management layer 22, preferably uniaxial or a biaxial film, for modulating the polarization state. The output polarization management layer 22 may be a uniaxial film with optical axis vertical to the upper side of the waveguide.

The ray 21 is TIR-reflected and encounters the polarization management layer 22 again upon reflection. Then the light encounters the output polarization volume grating 23, which selectively out-couples the light 21 with certain polarization state and transmit the other polarization state. The output polarization management layer 22 is designed to manage the polarization state of the light ray such that upon each TIR reflection cycle (e.g., light ray 24, 25 and 26), a desired amount of electromagnetic wave 21 (for example, a nearly equal amount of light) was deflected toward the viewer's pupil 27.

Here, we identify the limitation of this method as it is challenging to fabricate gratings with well-controlled gradient efficiency. Furthermore, we identify that the gradient efficiency will lead to gradient transmittance of the ambient light, resulting in a gradient gray appearance for the glasses. So, we propose to control the deflection amount of light through polarization management.

The output polarization management layer 22 can be provided at any position in the waveguide 13 or on the surface of the waveguide 13. As shown in FIG. 2, the waveguide 13 has an upper side and a lower side and the electromagnetic wave 24, 25, 26 is output from the lower side. For example, the output polarization management layer 22 can be disposed on the upper side, or the output polarization management layer 22 can be disposed between a front side of the output polarization volume grating 23 and the lower side or is disposed on the lower side.

In an example, as shown in FIG. 2, the output polarization management layer 22 is disposed between a backside of the output polarization volume grating 23 and the upper side. As such, it can avoid leakage of the light.

The output polarization management layer 22 may adjust the polarization of the desired portions of the electromagnetic wave to a polarization state opposite to that of the electromagnetic wave being guided in the waveguide. For example, the electromagnetic wave 21 guided in the waveguide 13 is left-handedness or right-handedness polarized electromagnetic wave, and the output polarization management layer 22 adjusts the polarization of desired portions of the electromagnetic wave 21 to a right-handedness or left-handedness polarization state.

The output polarization management layer 22 can be a liquid crystal layer. Optionally, the output polarization management layer 22 has a patterned optical axis. As such it is possible to actively control the output intensity distribution even after the output coupler is fabricated. For example, the liquid crystal layer has a thickness between 0.1 to 5 micrometers. Optionally, the said liquid crystal layer has a birefringence between 0.02 to 0.2. The liquid crystal layer may be electrically addressable. This allows for large exit-pupil with the capability to electrically control the exit-pupil location.

As such, the output polarization management layer 22 is controllable to adjust the polarization of desired portions at various positions along the output management component. For example, the intensifies of the electromagnetic wave deflected out of the output coupler component by the output polarization volume grating 23 are even along the output coupler component from the side of the waveguide to the other end of the output coupler component. Alternatively, the intensities of the electromagnetic wave deflected out of the output coupler component by the output polarization volume grating 23 are not even along the output coupler component from the side of the waveguide to the other end of the output coupler component. Alternatively, the intensities of the electromagnetic wave deflected out of the output coupler component by the output polarization volume grating 23 are controlled to track the pupil of a viewer's eye, by controlling the output polarization management layer 22 to adjust the polarization of desired portions at various positions along the output polarization management layer 22.

The electromagnetic wave 21 may be light, such as light of an image. It can be visible light, or infrared light, or ultraviolet light. The output coupler component may include the waveguide 13.

The output coupler may be a holographic grating, a surface-relief grating or a polarization volume grating.

Figure 3:
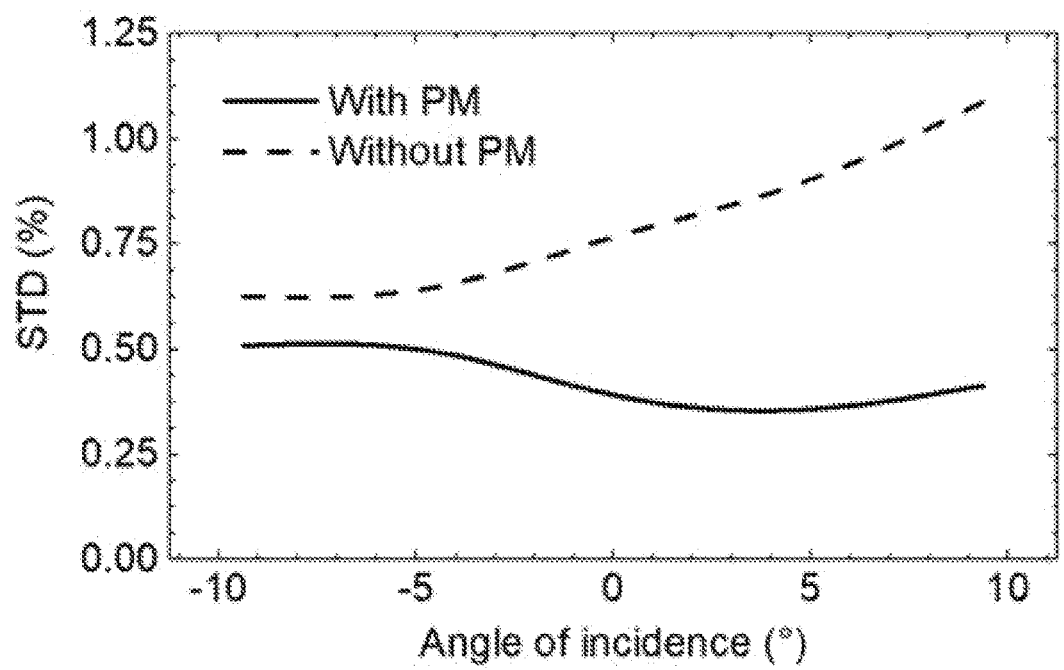
FIG. 3 is a plot comparing the different configurations of optical display systems.

FIG. 3 is an exemplary performance plot comparing two output uniformity with and without additional polarization management film, such as the output polarization management layer 22 in FIG. 2. In this particular example, collimated light from −10° to 10° is analyzed. The index of the waveguide is 1.56. The birefringence of PVG is 0.15. The film thickness of the input coupler component is chosen at 2 μm for an on-axis efficiency of 95% for right-handed circularly polarized light, and the output coupler component is Chosen at 0.4 μm for an on-axis efficiency of 20% for right-handed circularly polarized light (and therefore 90% transmission of the unpolarized environment light). The wavelength is 532 nm. The coupler component is 4.8 mm in width, the output coupler component is 14.3 mm in width, and the liquid crystal LC film used as polarization management layers is 16.7 mm in width. The birefringence of the LC film used as polarization management layers is 0.1, and the thickness of the LC film is 2.13 μm. The five azimuthal angles are 60.6°, 41.0°, 38.0°, 10.6°, and 77.9°. The LC film is separated into five different sections with equal length, and each of them has a different azimuthal angle φ. The standard deviation of output intensity is plotted for an indication of uniformity. In the plot of FIG. 3, the horizon axis is the angle of incidence of the light, and the vertical axis is the standard deviation of output uniformity for the light. In FIG. 3, the solid line represents the result of the system with the polarization management layer, and the dash line represents the result of the system without the polarization management layer. The polarization management method significantly reduces the standard deviation in this exemplary design from an average of 0.79% to 0.43%.

Figure 4:
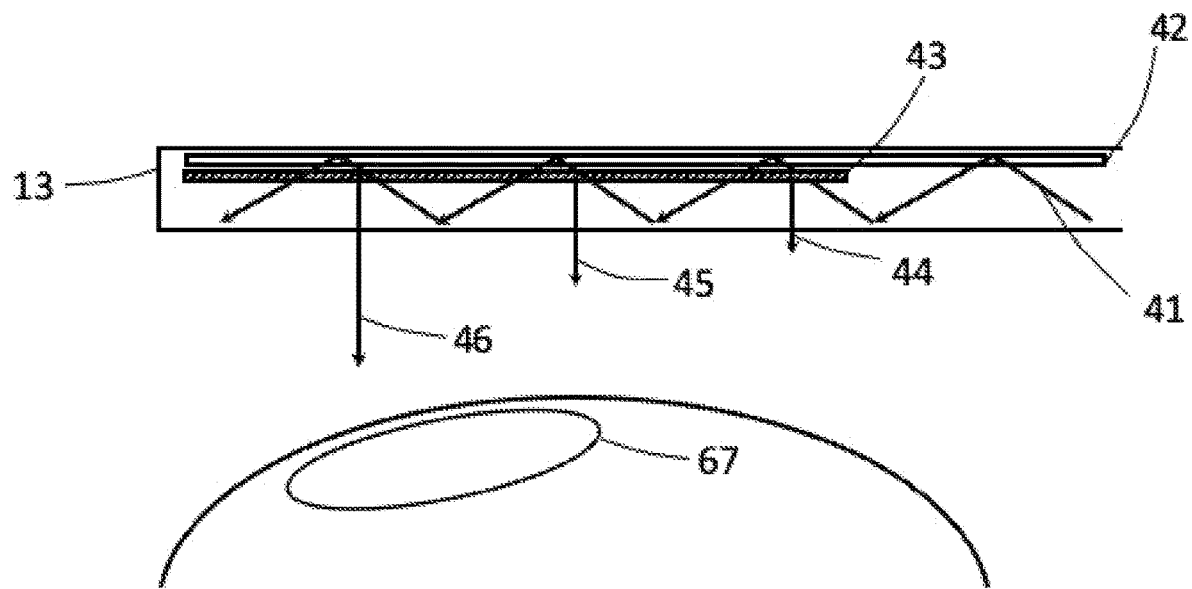
FIG. 4 is a top schematic plan view of an optical display system according to an exemplary augmented reality application embodiment of the disclosure.

FIG. 4 schematically illustrates the output side of the waveguide, i.e. the output coupler component as described above. The electromagnetic waver such as light ray 41 from, the input side of the waveguide encountered a polarization management layer 42, preferably a liquid crystal layer, for modulating the polarization state. The ray 41 is TIR-reflected and encounters the polarization management layer 42 again upon reflection. Then the light encounters the output coupling grating 43, which selectively out-couples the light with certain polarization state and transmits the light with other polarization state. The polarization management layer 42 is addressable with designed electrode pattern to manage the polarization state of the light ray such that upon each TIR reflection cycle (e.g., light ray 44, 45 and 46), the light ray has an output intensity distribution maximized near the location of the pupil 67 (i.e., intensity of the ray is higher for ray 46, and lower for ray 44).

Figure 5:
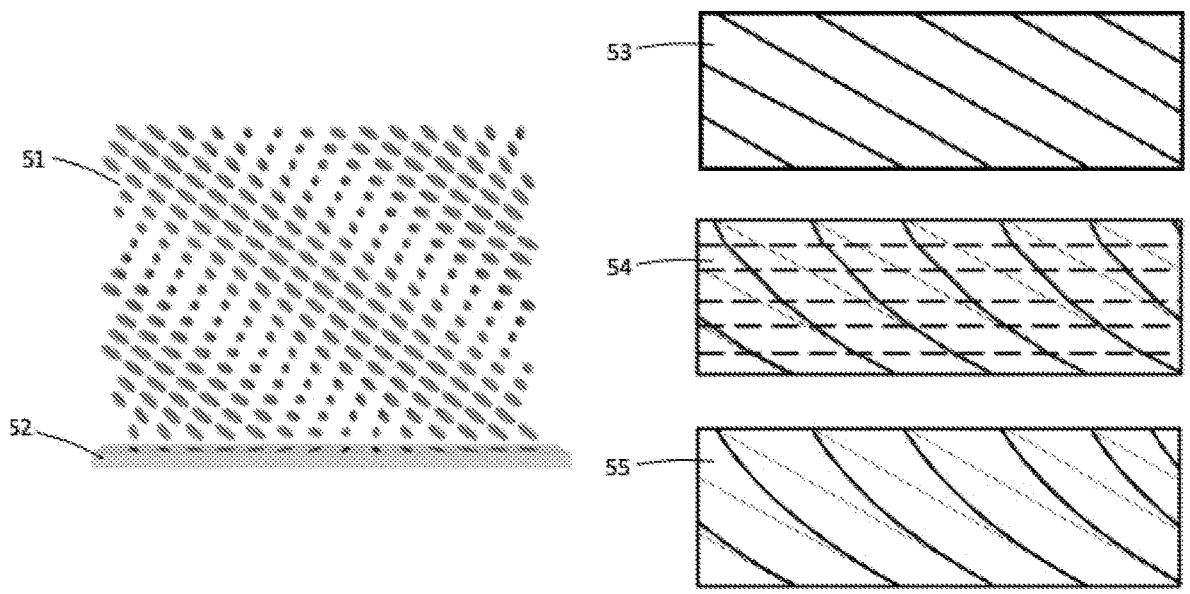
FIG. 5 is a schematic illustration of different liquid crystal molecule orientation configurations in polarization volume grating.

FIG. 5 schematically illustrates configurations of chirped polarization volume gratings. The orientation of liquid crystal molecules 51 is periodically twisted in the transverse direction, which is parallel to the substrate 52. The liquid crystal molecule orientation may have different twist structures in the axial direction, which is perpendicular to the substrate 52. In configuration 53, the liquid crystal molecule has a constant twist pitch in the axial direction. In configuration 54, the polarization volume grating is made by cascading two or more thin sublayer of polarization volume gratings in configuration 53, but with different twist pitches in the axial direction. In configuration 55, the liquid crystal molecule has a continuously changing twist pitch in the axial direction. With customized twist behavior, the spectral and angular performance of polarization volume grating can be further improved.

Figure 6:
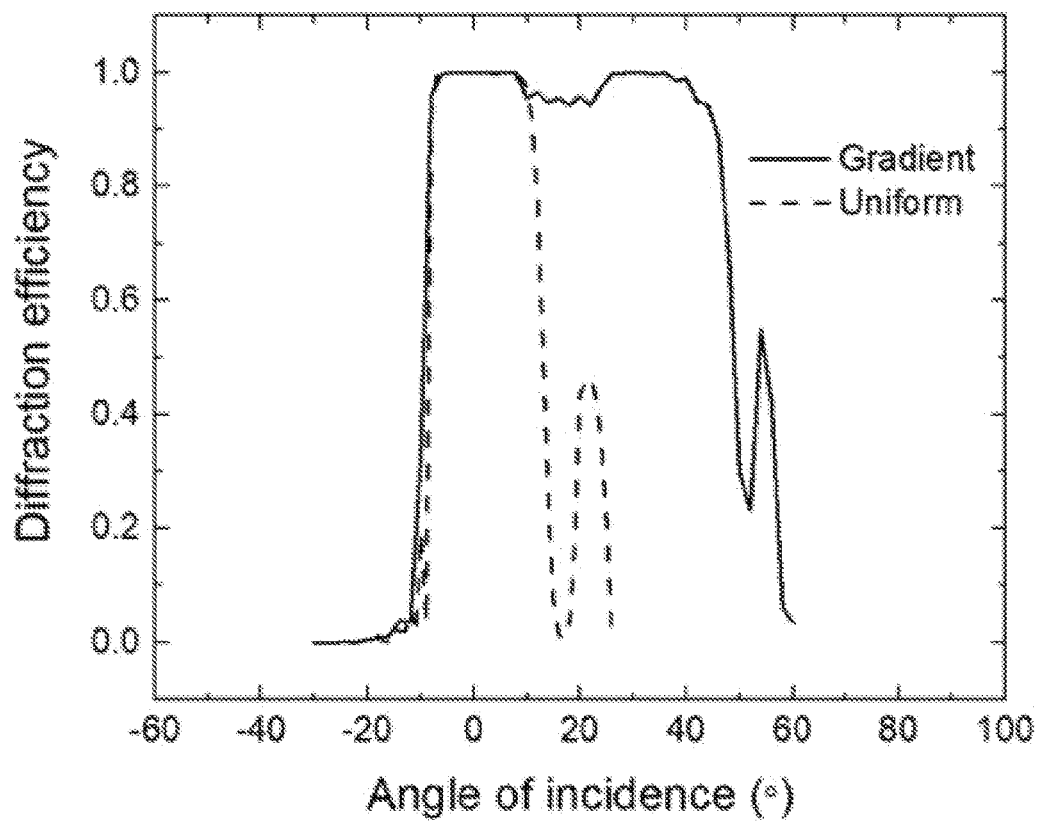
FIG. 6 is a plot comparing the angular performance of polarization volume gratings with different liquid crystal molecule orientation.

FIG. 6 shows an exemplary performance plot, comparing the angular diffraction performance of polarization gratings with a uniform and gradient changing twist pitch in the axial direction. With a non-constant twist rate in the axial direction, the high-efficiency bandwidth of polarization volume grating can be significantly increased from 25° to 55°.

Figure 7:
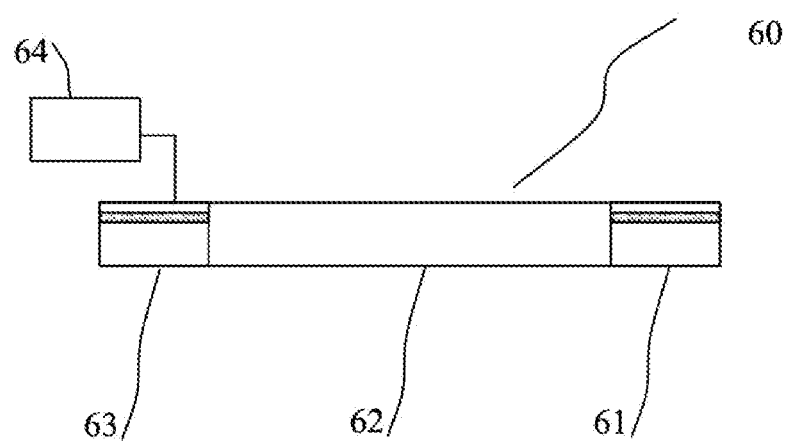
FIG. 7 shows a schematic diagram of an optical display system according to an embodiment.

FIG. 7 shows a schematic diagraph of an optical display system according to an embodiment. As shown in FIG. 7, the optical display system 60 includes an input coupler component 61 and an output coupler component 63, both of which are as described above. The optical display system 60 also includes a waveguide 62.

The optical display system 60 may further comprises an eye-tracking module 64. The eye-tracking module 64 can detect the location of a viewer's eye, for example, detect the location of the pupil. The output polarization management layer of the output coupler component 63 can be controlled based on the detected location to adjust the polarization of desired portions at various positions along the output polarization management layer, to track the pupil of the viewer's eye. As such, the output polarization management layer of the output coupler component 63 is electrically addressable and is disposed to control the polarization state of the light such that the intensity of the light will be maximized near the observer's pupil when out-coupled by the said output coupler.

Here, we propose a polarization volume grating (PVG) for wave guide-based optical display system, such as AR displays. The polarization volume grating may be reflective and can reduce the amount of light leakage at input side with a thin waveguide and allows for a large exit-pupil. The polarization volume grating may have the capability to electrically control the exit-pupil location. The reflective PVG can selectively deflect a linear polarized light (U.S. Pat. No. 6,567,573 B1; also known as holographic polymer-dispersed liquid crystal or H-PDLC) or selectively deflect a circularly polarized light as reported by [Y. Wen, D. Zhang, X. Li, and S. T. Vu, "A polarization volume grating with high efficiency and large diffraction angle," Opt. Express 24(16), 17746-17759 (2016)].

In an exemplary, non-limiting embodiment, the optical display system includes a display module whose polarization is defined by a polarizer. This display light is collimated and deflected by the input-coupler component, which include a polarization-dependent grating, such as a reflective PVG. Upon deflection, the display light is guided into the waveguide. A polarization management layer, preferably a uniaxial film or a biaxial film, is deployed to modulate the polarization state of the guided light, such that if the guided light hits the input-coupler again, clue to the selectivity of the input-coupler, the deflected light is minimized. This alleviates the constraint and allows for thinner waveguide or larger input-coupling region.

In an exemplary, non-limiting embodiment, the optical display system includes a display module whose polarization is defined by a polarizer. This display light is collimated and deflected by the input-coupler, which is a polarization-dependent grating such as a reflective PVG. Upon deflection, it is guided into the waveguide. A polarization management layer, preferably a uniaxial film or a biaxial film or a liquid crystal layer, is deployed to modulate the polarization state of the guided light, such that when the guided light hits the output-coupler, the polarization selectivity of the output coupler component will result in gradual out-coupling and lead to a desired distribution of the out-coupled light with sufficiently large eye box. Optionally, the polarization management layer may be a liquid crystal layer addressable with applying voltage, such that the time-averaged output intensity is uniform in each frame of the image.

In an exemplary, non-limiting embodiment the optical display system includes a display module whose polarization is defined by a polarizer. This display light is collimated and deflected by the input-coupler, which is a polarization-dependent grating such as a reflective PVG. Upon deflection, it is guided into the waveguide. The user's eye is tracked with an eye-tracking module, An electrically addressable polarization management layer, preferably a liquid crystal layer, is deployed to modulate the polarization state of the guided light, such that when reaching the out-coupling grating, the polarization is modulated by the addressable liquid crystal layer and result in localized highest intensity according to the eye location, maximizing the light entering the user's eye.

The optical display system may be liquid crystal on silicon displays (LCoS), micro liquid crystal display (LCD), micro-organic light-emitting diode displays (OLED), digital light processor (DLP), or micro light-emitting diode displays (LED) or other types of displays known in the art. For example, extra waveguides and corresponding volume gratings may be disposed for different spectra portion. Here a symmetric setup is utilized for the other eye to allow binocular display.

Figure 8:
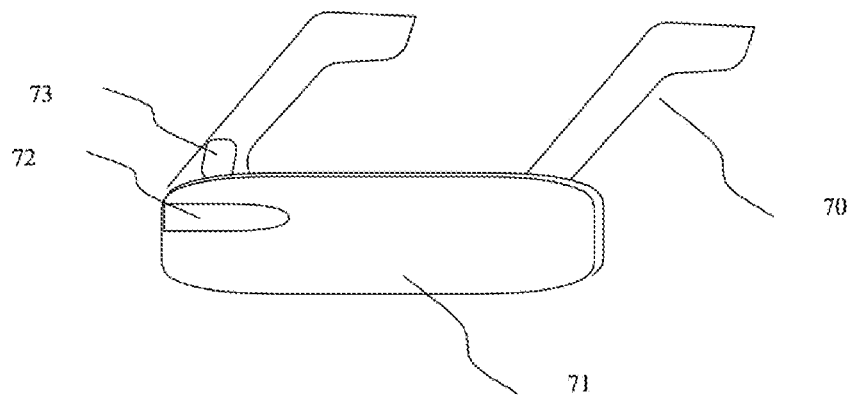
FIG. 8 shows a schematic diagram of an electronic device according to an embodiment.

FIG. 8 shows a schematic diagram of an electronic device according to an embodiment.

The electronic device 70 comprises the optical display system 72 as described above. The electronic device may be a near-eye display, preferably, an augmented reality display.

As shown in FIG. 8, the electronic device 70 may be a glass, which includes glasses lens 71. The optical display system 72 may, for example, be placed on the glasses lens 71. The electronic device 70 may further include an electronics circuit 73 for generating images or other functions.

Although some specific embodiments of the present disclosure have been demonstrated in detail with examples, it should be understood by a person skilled in the art that the above examples are only intended to be illustrative but not to limit the scope of the present disclosure.

What is claimed is:

1. An input coupler component for coupling an input electromagnetic wave having an initial polarization state into a waveguide, comprising:
    an input polarization volume grating, disposed to deflect the input electromagnetic wave into the waveguide as a deflected electromagnetic wave in a total internal reflection (TIR) manner; and
    an input polarization management layer coupled to the input polarization grating and adapted to adjust the deflected electromagnetic wave from the initial polarization state to a different polarization state,
    wherein the waveguide has an upper side and a lower side such that the input electromagnetic wave is input from the lower side, and the input polarization management layer is disposed between a back of the input polarization volume grating and the upper side of the waveguide,
    wherein the waveguide is positioned such that the deflected electromagnetic wave is TIR-reflected at the lower side of the waveguide to pass through the input polarization volume grating and encounter the input polarization management layer; and
    further TIR-reflected from the upper side of the waveguide to encounter the input polarization management layer for adjustment to the different polarization state and pass through the input polarization volume grating.

2. The component according to claim 1, wherein the input polarization management layer is adapted to adjust the deflected electromagnetic wave from the initial polarization state to a polarization state opposite to that of the initial polarization state.

3. The component according to claim 1, wherein the input polarization volume grating is adapted to deflect one of a left-handedness or right-handedness polarized electromagnetic wave, and the input polarization management layer is adapted to adjust the deflected electromagnetic wave from the left-handedness to a right-handedness polarization state or from the right-handedness to a left-handedness polarization state.

4. An optical display system, comprising:
    the input coupler component according to claim 1; and
    an output coupler component.

5. The optical display system according to claim 4, wherein the output coupler component comprises:
    an output polarization volume grating, disposed to selectively deflect the electromagnetic wave guided by the waveguide out of the waveguide; and
    an output polarization management layer coupled to the output polarization grating and adapted to manage an amount of the electromagnetic wave to be deflected by the output polarization volume grating by adjusting polarization of at least a portion of the electromagnetic wave to a polarization state to be deflected.

6. The optical display system according to claim 5, wherein the waveguide has an upper side and a lower side; the electromagnetic wave is output from the lower side, and
    wherein the output polarization management layer is selected from the group consisting of a layer disposed between a backside of the output polarization volume grating and the upper side, and a layer disposed between a front side of the output polarization volume grating and the lower side.

7. The optical display system according to claim 5, wherein the electromagnetic wave guided in the waveguide is one of a left-handedness or a right-handedness polarized electromagnetic wave, and the output polarization management layer is adapted to adjust the at least portions of the electromagnetic wave from the left-handedness to a right-handedness polarization state or from the right-handedness to a left-handedness polarization state.

8. The optical display system according to claim 4, further comprising:
    an eye-tracking module, which detects a location of a viewer's eye, and
    wherein the output polarization management layer is controlled based on the detected location to adjust the polarization of the at least portions at various positions along the output polarization management layer, to track the pupil of the viewer's eye.

9. An electronic device comprising the optical display system according to claim 4.

10. The optical display system according to claim 4, wherein the output polarization management layer is configured to be electrically addressed using a designed electrode pattern to manage the polarization state of light such that intensity of the light is maximized near a pupil when the light is out-coupled by the output coupler.

* * * * *